US012676424B2

(12) United States Patent
Vigano et al.

(10) Patent No.: US 12,676,424 B2
(45) **Date of Patent: *Jul. 7, 2026**

(54) PHASED ARRAY ANTENNA

(71) Applicant: VIASAT, INC., Carlsbad, CA (US)

(72) Inventors: Maria Carolina Vigano, Lausanne (CH); Kenneth V. Buer, Gilbert, AZ (US); Douglas J. Mathews, Mesa, AZ (US)

(73) Assignee: VIASAT, INC., Carlsbad, CA (US)

( * ) Notice: Subject to any disclaimer, the term of this patent is extended or adjusted under 35 U.S.C. 154(b) by 931 days.

This patent is subject to a terminal disclaimer.

(21) Appl. No.: 17/938,084

(22) Filed: Oct. 5, 2022

(65) Prior Publication Data

US 2023/0026125 A1 Jan. 26, 2023

Related U.S. Application Data

(63) Continuation of application No. 17/164,396, filed on Feb. 1, 2021, now Pat. No. 11,482,791, which is a (Continued)

(51) Int. Cl.
*H01Q 21/00* (2006.01)
*H01Q 1/22* (2006.01)
(Continued)

(52) U.S. Cl.
CPC ....... *H01Q 21/0025* (2013.01); *H01Q 1/2283* (2013.01); *H01Q 3/2658* (2013.01);
(Continued)

(58) Field of Classification Search
CPC ............. H01Q 1/2283; H01Q 21/0025; H01Q 3/26–42
See application file for complete search history.

(56) References Cited

U.S. PATENT DOCUMENTS

| | | | |
|---|---|---|---|
| 5,327,150 A | 7/1994 | Cherrette | |
| 5,471,220 A | 11/1995 | Hammers et al. | |

(Continued)

FOREIGN PATENT DOCUMENTS

| | | |
|---|---|---|
| CN | 106207492 | 6/2019 |
| EP | 2178119 | 4/2010 |

OTHER PUBLICATIONS

Akkermans, “Antennas and Packaging for millimeter-wave phased-array transceivers” The European Microwave Conference, 2008—safe.nrao.edu; found on internet on Apr. 25, 2018 at: https://safe.nrao.edu/wiki/pub/Main/EuropeanMicrowaveWeek08/WFR14-4.pdf.

(Continued)

*Primary Examiner* — Ab Salam Alkassim, Jr.
(74) *Attorney, Agent, or Firm* — F. CHAU & ASSOCIATES, LLC

(57) ABSTRACT

A phased array antenna includes an array of antenna element modules. Each of the array of antenna element modules includes a dielectric substrate having a lower surface and a radiating element. Each of the antenna element modules also includes an integrated circuit (IC) chip adhered to the lower surface of the dielectric substrate. The IC chip includes a circuit to adjust a signal communicated with the radiating element. The phased array antenna also includes a multi-layer substrate underlying the array of antenna element modules, the multi-layer substrate including a beam forming network (BFN) circuit formed on a layer of the multi-layer substrate and the BFN circuit is in electrical communication with the IC chip of each of the array of antenna element modules.

20 Claims, 10 Drawing Sheets

Related U.S. Application Data continuation of application No. 15/962,294, filed on Apr. 25, 2018, now Pat. No. 10,944,180.

(60) Provisional application No. 62/570,221, filed on Oct. 10, 2017, provisional application No. 62/530,426, filed on Jul. 10, 2017.

(51) Int. Cl.

*H01Q 3/26* (2006.01)
*H01Q 3/40* (2006.01)
*H01Q 1/38* (2006.01)
*H01Q 21/06* (2006.01)

(52) U.S. Cl.

CPC ........... *H01Q 3/40* (2013.01); *H01Q 21/0087* (2013.01); *H01Q 21/0093* (2013.01); *H01Q 1/38* (2013.01); *H01Q 21/065* (2013.01)

(56) References Cited

U.S. PATENT DOCUMENTS

| | | | | |
|---|---|---|---|---|
| 6,166,705 | A | 12/2000 | Mast et al. | |
| 6,456,252 | B1 | 9/2002 | Goyette | |
| 6,774,848 | B2 | 8/2004 | Wright | |
| 7,782,624 | B2 | 8/2010 | Fujii | |
| 8,256,685 | B2 | 9/2012 | Chen et al. | |
| 8,451,618 | B2 | 5/2013 | Boeck et al. | |
| 8,497,805 | B2 * | 7/2013 | Rofougaran | H01Q 23/00 343/795 |
| 8,854,277 | B2 | 10/2014 | De Graauw et al. | |
| 9,053,406 | B2 | 6/2015 | Higashiyama | |
| 9,059,490 | B2 | 6/2015 | Devries et al. | |
| 9,196,951 | B2 | 11/2015 | Baks et al. | |
| 9,281,254 | B2 * | 3/2016 | Yu | H01L 24/97 |
| 9,472,859 | B2 | 10/2016 | Dang et al. | |
| 9,831,564 | B1 * | 11/2017 | Xie | H01Q 1/2283 |
| 10,290,586 | B2 | 5/2019 | Hu | |
| 10,354,964 | B2 | 7/2019 | Yu et al. | |
| 10,762,319 | B2 | 9/2020 | Tai et al. | |
| 10,777,518 | B1 * | 9/2020 | Wang | H01L 21/4857 |
| 10,862,196 | B2 | 12/2020 | Haridas et al. | |
| 10,944,180 | B2 * | 3/2021 | Vigano | H01Q 3/2658 |
| 11,088,432 | B2 | 8/2021 | Seok et al. | |
| 11,189,905 | B2 * | 11/2021 | Gu | H01L 23/5389 |
| 11,189,918 | B2 * | 11/2021 | Wang | H01Q 3/34 |
| 11,356,131 | B2 * | 6/2022 | Ouyang | H01Q 21/062 |
| 11,482,791 | B2 * | 10/2022 | Vigano | H01Q 21/0025 |
| 11,482,795 | B2 * | 10/2022 | Sikina | H01Q 1/38 |
| 2002/0007966 | A1 | 1/2002 | Miller et al. | |
| 2007/0152882 | A1 | 7/2007 | Hash et al. | |
| 2008/0252521 | A1 | 10/2008 | Sabet et al. | |
| 2010/0190464 | A1 | 7/2010 | Chen et al. | |
| 2012/0068906 | A1 | 3/2012 | Asher et al. | |
| 2013/0027271 | A1 | 1/2013 | Kam et al. | |
| 2013/0207274 | A1 * | 8/2013 | Liu | H01L 23/66 257/774 |
| 2014/0145883 | A1 * | 5/2014 | Baks | H01L 23/66 343/700 MS |
| 2015/0097633 | A1 * | 4/2015 | DeVries | H01P 3/08 333/33 |
| 2015/0325925 | A1 * | 11/2015 | Kamgaing | H01L 21/4853 343/893 |
| 2015/0340765 | A1 * | 11/2015 | Dang | H01Q 1/2208 343/893 |
| 2016/0049723 | A1 * | 2/2016 | Baks | H01Q 9/0457 343/848 |
| 2016/0276731 | A1 * | 9/2016 | Seok | H05K 3/4644 |
| 2016/0282462 | A1 | 9/2016 | Pitts et al. | |
| 2017/0025749 | A1 | 1/2017 | Frye et al. | |
| 2017/0187105 | A1 | 6/2017 | Emerick et al. | |
| 2018/0233465 | A1 * | 8/2018 | Spella | H01Q 19/28 |
| 2018/0247905 | A1 | 8/2018 | Yu et al. | |
| 2019/0267716 | A1 * | 8/2019 | Yoon | H01Q 13/0233 |
| 2019/0267722 | A1 | 8/2019 | Yoon et al. | |
| 2020/0259267 | A1 * | 8/2020 | Park | H01Q 21/0025 |
| 2020/0350696 | A1 * | 11/2020 | Zhu | H01Q 21/0006 |
| 2021/0184366 | A1 | 6/2021 | Vigano et al. | |
| 2021/0257739 | A1 | 8/2021 | Mathews et al. | |
| 2022/0263228 | A1 * | 8/2022 | Cho | H01Q 1/243 |
| 2024/0154320 | A1 * | 5/2024 | Franson | H01Q 21/061 |

OTHER PUBLICATIONS

Carchon: "3D Microwave Module Packaging"; found on the internet Apr. 25, 2018 at: https://escies.org/download/webDocumentFile?id= 19653.

D Goel, KJ Vinoy—Progress in Electromagnetics Research, 2011—jpier.org; found on the internet Apr. 25, 2018 at: http://www.jpier.org/PIERB/pierb30/14.11041105.pdf.

DG Kam, D Liu, A Natarajan, S Reynolds, HC Chen, BA Floyd, "LTCC Packages With Embedded Phased-Array Antennas for 60 GHz Communications", IEEE Microwave and Wireless Components Letters, 2011, 21 (3), 142-144.

Li, et al., "Embedded Wafer Level Packaging for 77-GHz Automotive Radar Front-End with Through Silicon via and its 3-D Integration"; IEEE Transactions on Components, Packaging and Manufacturing Technology, vol. 3, Issue: 9, Sep. 2013.

Zwick, et al., "Pea-Sized mmW Transceivers"; Published in: IEEE Microwave Magazine ( vol. 18, Issue: 6, Sep.-Oct. 2017 ), pp. 79-89, Date of Publication: Aug. 8, 2017, DOI: 10.1109/MMM.2017.2712020, Sponsored by: IEEE Microwave Theory and Techniques Society.

* cited by examiner

PHASED ARRAY ANTENNA

RELATED APPLICATIONS

The present Application is a continuation application of U.S. patent application Ser. No. 17/164,396, filed Feb. 1, 2021, which is a continuation application of U.S. patent Ser. No. 15/962,294 filed on 25 Apr. 2018, entitled, "Phased Array Antenna", which claims priority to U.S. Provisional Application No. 62/530,426 filed on 10 Jul. 2017, entitled, "Antenna Array with Split-Level Circuit Board Architecture" and to U.S. Provisional Application No. 62/570,221 filed on 10 Oct. 2017, entitled, "Antenna Array with Embedded Integrated Circuit", the entirety of each is incorporated herein by reference.

TECHNICAL FIELD

This relates generally to a phased array antenna.

BACKGROUND

An antenna array (or array antenna) is a set of multiple connected antenna elements that work together as a single antenna to transmit or receive radio waves. The individual antenna elements (often referred to simply as "elements") can be connected to a receiver or transmitter by feedlines that feed the power to the elements in a specific phase relationship. The radio waves radiated by each individual antenna element combine and superpose with each other, adding together (interfering constructively) to enhance the power radiated in desired directions, and cancelling (interfering destructively) to reduce the power radiated in other directions. Similarly, when used for receiving, the separate radio frequency currents from the individual antenna elements combine in the receiver with the correct phase relationship to enhance signals received from the desired directions and cancel signals from undesired directions.

An antenna array can achieve an elevated gain (directivity) with a narrower beam of radio waves, than could be achieved by a single antenna. In general, the larger the number of individual antenna elements used, the higher the gain and the narrower the beam. Some antenna arrays (such as phased array radars) can be composed of thousands of individual antennas. Arrays can be used to achieve higher gain (which increases communication reliability), to cancel interference from specific directions, to steer the radio beam electronically to point in different directions and for radio direction finding (RDF).

SUMMARY

One example relates to a phased array antenna that includes an array of antenna element modules. Each of the array of antenna element modules includes a dielectric substrate having a lower surface and a radiating element. Each of the antenna element modules also includes an integrated circuit (IC) chip adhered to the lower surface of the dielectric substrate. The IC chip includes a circuit to adjust a signal communicated with the radiating element. The phased array antenna also includes a multi-layer substrate underlying the array of antenna element modules. The multi-layer substrate includes a beam forming network (BFN) circuit formed on an layer of the multi-layer substrate and the BFN circuit is in electrical communication with the IC chip of each of the array of antenna element modules.

Another example relates to a method for forming a phased array antenna. The method includes forming a plurality of antenna element modules. Each of the array of antenna element modules includes a dielectric substrate having a lower surface and a radiating element. Each of the antenna element modules also includes an integrated circuit (IC) chip adhered to the lower surface of the dielectric substrate. The IC chip includes a circuit to adjust a signal communicated with the radiating element. The method also includes forming a multi-layer substrate configured to underlie the array of antenna element modules. The multi-layer substrate includes a beam forming network (BFN) circuit formed on an layer of the multi-layer substrate and the BFN circuit is configured for electrical communication with the IC chip of each of the array of antenna element modules. The method further includes mounting each of the plurality of antenna element modules on the multi-layer substrate.

DETAILED DESCRIPTION

This disclosure describes a phased array antenna wherein a plurality of antenna element modules can be mounted on a multi-layer substrate in a split-level architecture. Each of the antenna element modules can include a dielectric substrate having a radiating element. Each of the antenna element modules can include an embedded integrated circuit (IC) chip. In particular, in each antenna element module, the embedded IC chip can be adhered to a lower surface of the dielectric substrate. Each IC chip can include circuitry for adjusting (e.g., amplifying, filtering and/or phase shifting) a signal communicated between the radiating element and circuitry in the multi-layer substrate. The multi-layer substrate underlies the array of antenna element modules. The multi-layer substrate can include a beam-forming network (BFN) circuit formed on a layer of the multi-layer substrate. The BFN circuit can be in electrical communication with the IC chip of each of the array of antenna element modules.

The phased array antenna described herein allows for modular design and fabrication. In particular, each of the antenna element modules can be designed and/or fabricated at a separate time and/or facility from the multi-layer substrate. This modular design and/or fabrication can allow for lower cost and higher performance of the resultant phased array antenna. For instance, the board arrangement allowed by the split-level architecture can permit each circuit board to have a relatively low complexity (e.g., can avoid a need for blind vias), and thus the entire resultant assembly can be lower cost as compared to use of a single circuit board.

Figure 1:
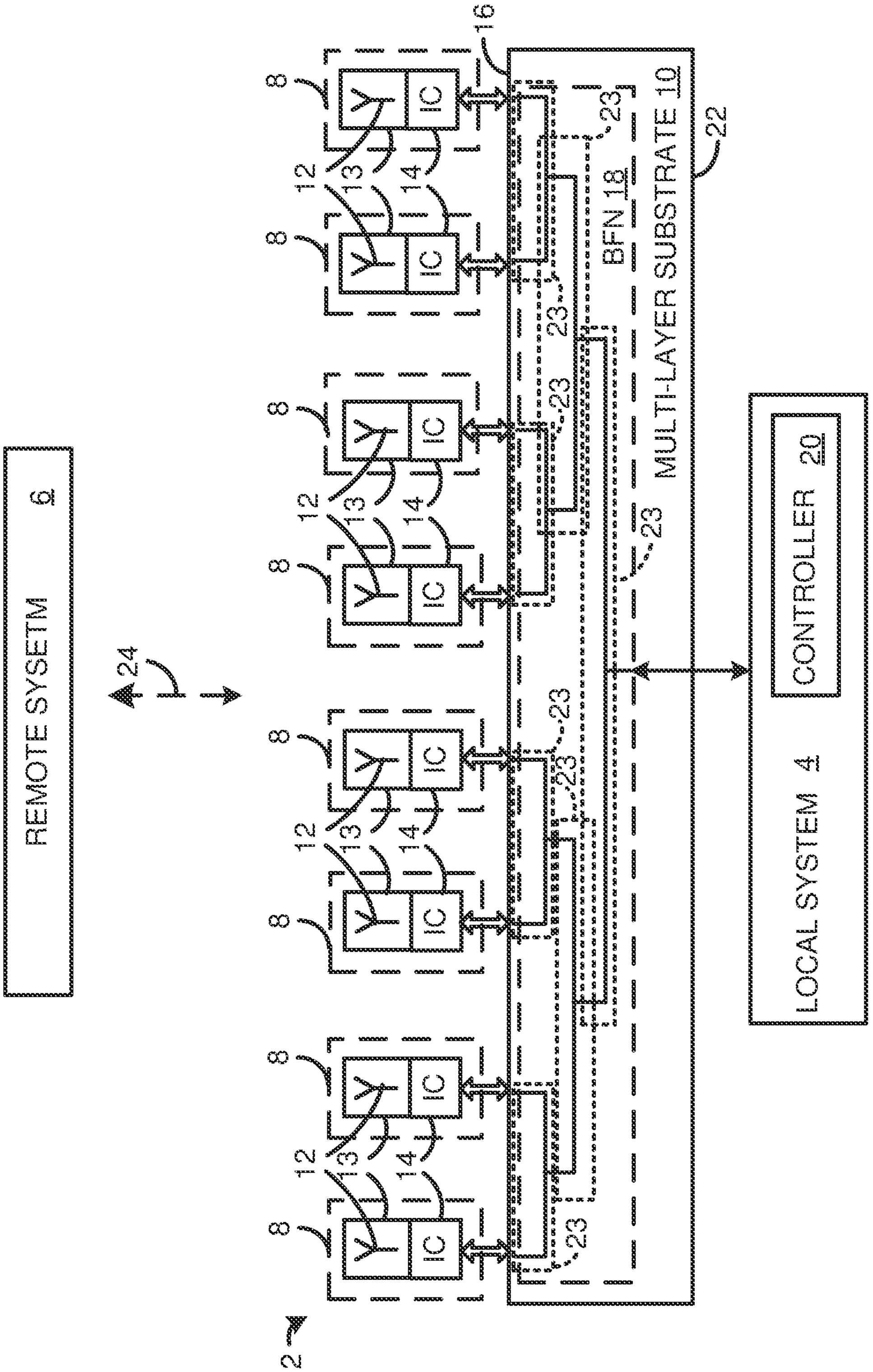
FIG. 1 illustrates a block diagram of an example phased array antenna with a split-level architecture.

FIG. 1 illustrates a block diagram of an example phased array antenna 2. The phased array antenna 2 facilitates wireless communication between a local system 4 and a remote system 6. The local system 4 can be wired to the phased array antenna 2. As some examples, the local system 4 can be implemented on a terrestrial station or an airborne station (e.g., an aircraft or satellite). Additionally, the phased array antenna 2 can be in wireless communication with the remote system 6. The remote system 6 can be an airborne station (e.g., an aircraft or satellite). Alternatively, the remote system 6 can be a terrestrial station. The local system 4 and the remote system 6 can be representative of computing systems (e.g., servers) and/or routers that can process, transmit and receive data.

The phased array antenna 2 can have a split-level architecture. In particular, the phased array antenna 2 can include a plurality of antenna element modules 8 that can be mounted on a multi-layer substrate 10. The multi-layer substrate 10 can be implemented, for example, as a multi-layer circuit board with multiple layers of circuit board materials (e.g., dielectric materials, electrically conductive materials, etc.). Each antenna element module 8 can include a radiating element 12 and an integrated circuit (IC) chip 14. The radiating element 12 can be disposed on or integrated with a dielectric substrate 13 (e.g., a single or multi-layer circuit board, a wide-angle impedance matching metamaterial (WAIM), etc.), in FIG. 1. In some examples, each radiating element 12 can be implemented as a patch antenna or a type of microstrip antenna (e.g., a slot antenna) formed on a top layer or embedded in the dielectric substrate 13. Alternatively, each radiating element 12 can be implemented as a discrete antenna mounted on the dielectric substrate 13. The IC chip 14 can be adhered to a lower surface of the dielectric substrate 13. Each antenna element module 8 can be adhered (mounted) on a top surface 16 of the multi-layer substrate 10. In some examples, each antenna element module 8 can include a feedline extending through the dielectric substrate 13 that couples (e.g., a direct connection, passively coupled, etc.) the IC chip 14 with the radiating element 12. Moreover, each radiating element 12 of FIG. 1 can be a single radiating element, such that there is an equal number of IC chips 14 and radiating elements 12 across the phased array antenna 2. Alternatively, each radiating element 12 of FIG. 1 can be a plurality of radiating elements, wherein each IC chip 14 can include multiple circuits for individually adjusting signals communicated between the radiating element 12 and the IC chip 14.

For purposes of simplification of explanation the terms "top" and "bottom" are employed throughout this disclosure to denote opposing surfaces in a selected orientation. Similarly, the terms "upper" and "lower" are employed to denote relative positions in the selected orientation. Further, the terms "underlying" and "overlay" (as well as derivative words) are employed to denote a relative position of two adjacent surfaces or elements in the selected orientation. In fact, the examples used throughout this disclosure denote one selected orientation. However, in the described examples, the selected orientation is arbitrary, and other orientations are possible (e.g., upside down, rotated by 90 degrees, etc.) within the scope of the present disclosure.

The multi-layer substrate 10 can include a beam-forming network (BFN) circuit 18. The BFN circuit 18 can be formed on a layer (or layers) of the multi-layer substrate 10. In some examples, the BFN 18 can be formed on an interior layer of the multi-layer substrate 10. In other examples, the BFN 18 can be formed on an exterior layer, such as a top layer or bottom layer. As described herein, the BFN circuit 18 operates as a combiner and/or divider circuit that combines and/or divides signals in-phase. In some examples, the BFN circuit 18 can be a passive circuit. As used herein, the term "passive circuit" indicates that the BFN circuit 18 includes circuit components, (e.g., resistive traces, capacitors and/or inductors) that that are not supplied power from a power supply. The BFN circuit 18 can be in electrical communication with the IC chip 14 of each antenna element module 8.

The local system 4 can include a controller 20 that can control an operating mode of the phased array antenna 2. As one example, the controller 20 can be implemented as a microcontroller with embedded instructions. In another example, the controller 20 can be implemented as a computing device with a processing unit (e.g., one or more processor cores) that executes machine code stored in a non-transitory memory. In some examples, the controller 20 can provide control signals via control lines (not shown) to the IC chips 14, that cause the IC chips 14 to set an amplitude and/or phase adjustment level of signals communicated between BFN circuit 18 and the radiating elements 8 of the antenna element modules 8. That is, the controller 20 can control the signal adjustment of the IC chips 14. Additionally or alternatively, in some examples, the controller 20 can provide control signals to the IC chips 14 that cause the phase array antenna 2 to operate in a receiving mode or a transmitting mode. Additionally, for purposes of simplification of explanation, in examples described herein the controller 20 also provides power signals to the IC chips 14 of the antenna element modules. However, in other examples, other sources can provide power for the IC chips 14.

In operation, in some examples, the phased array antenna 2 architecture can be designed to operate exclusively in the receiving mode or the transmitting mode. In other examples, as described herein, the phased array antenna 2 architecture can be designed to operate in half-duplex mode or polarization duplex mode, wherein the phased array antenna 2 switches between the receiving mode and the transmitting mode. In still other examples, the phased array antenna 2 architecture can be designed to operate in a frequency division multiplexing mode, such that the phased array antenna 2 can operate in the receiving mode and the transmitting mode concurrently.

In the receiving mode, radio frequency (RF) signals can be received from the remote system 6 by the radiating elements 12 on each of the plurality of antenna element modules 8, or some subset thereof. The radiating elements 12 can transfer the received signal to a corresponding IC chip 14 of a respective antenna element module 8. Each corresponding IC chip 14 can include circuitry that can adjust the received signal to output an element signal. In particular, each IC chip 14 can amplify, filter and/or phase shift the received signal to form the element signal.

Moreover, different IC chips 14 can provide different levels and types of adjustment. For example, a first IC chip 14 of a first antenna element 8 can amplify the received signal with a first gain and/or phase shift the received signal by a first phase shift. Additionally, a second IC chip 14 of a second antenna element 8 can amplify the received signal with a second gain and/or phase shift the received signal by a second phase shift. In this manner, the plurality of element signals output by the IC chips 14 can have specific properties to facilitate combination by the BFN circuit 18.

Each of the element signals output by the IC chips 14 can be provided to the BFN circuit 18. The BFN circuit 18 can combine the element signals to form a received beam signal. The received beam signal can be provided to the local system 4 through a connection port that can be located at a bottom surface 22 of the multi-layer substrate 10, or other location. The local system 4 can process (e.g., demodulate) the received beam signal and consume decoded data.

The BFN circuit 18 can be implemented with stages of combiner/dividers 23, illustrated in FIG. 1 as split lines. In the example illustrated in FIG. 1, there are three (3) such stages, but in other examples, there can be more stages or fewer stages (as few as one (1) stage) of combiner/divider circuits 23. Each combiner/divider circuit 23 can be implemented as a power combiner/divider circuit, such as a Wilkinson power divider, a hybrid coupler, a directional coupler, or any other circuit that can combine and/or divide signals. Each combiner/divider circuit 23 can combine or divide signals passing through the BFN circuit 18. For instance, when used for receiving, signals communicated between the IC chips 14 and the local system 4 can be combined by each stage of the combiner/divider circuits 23. Additionally or alternatively, when used for transmitting, signals communicated from the local system 4 to the IC chips 14 can be divided by each stage of the combiner/divider circuits 23 of the BFN circuit 18. As some examples, the BFN circuit 18 can combine the element signals in-phase or out of phase. Additionally or alternatively, the BFN circuit 18 can combine the element signals equally or unequally. In general, the architecture of the BFN circuit 18 can be designed for nearly any form of signal combining and/or dividing.

In the transmitting mode, the local system 4 can provide a transmit beam signal to the BFN circuit 18 that is intended to be transmitted to the remote system 6. The BFN circuit 18 divides the transmit beam signal to form a plurality of divided signals, which are referred to as element signals. The element signals can be provided to the IC chips 14 of the antenna element modules 8. Each IC chip 14 can adjust (e.g., amplify, filter and/or phase shift) a received element signal, and outputs an adjusted signal for a corresponding radiating element 12. In the transmitting mode, each IC chip 14 can be configured to provide a different level of adjustment than the adjustment in the receiving mode, including examples where the phased array antenna 2 operates in the receiving mode and the transmitting mode concurrently. For example, a given IC chip 14 can provide a different level of gain, a different phase shift and/or a different passband in the transmitting mode than in the receiving mode.

The radiating element 12 of each antenna element module 8 transmits the adjusted element signal provided by the corresponding IC chip 14, which superimpose with the transmissions of the other radiating elements 12 to form a beam of the transmit beam signal that propagates through free space to the remote system 6, as indicated by an arrow 24. The remote system 6 can demodulate received transmit beam signal and process resulting data. The phased array antenna 2 can be designed such that the transmit signals constructively and destructively interfere to produce the beam of the transmit beam signal with a radiation pattern having desired properties (e.g., a desired direction of maximum gain, and/or polarization). Additionally, in some examples, the adjustment (e.g., amplification and/or phase shift) by the plurality of IC chips 14 of each antenna element module 8 can be controllable by the controller 20 to steer the beam of the transmit beam signal in a desired direction. In examples where the phased array antenna 20 is designed to operate in the receiving mode and the transmitting mode, bi-directional wireless communication between the remote system 6 and the local system 4 can be established. Alternatively, in examples where the phased array antenna 20 is designed to operating in only the receiving mode or only the transmitting mode, unidirectional wireless communication between the remote system 6 and the local system 4 can be established.

By implementing the phased array antenna 2 of FIG. 1, a relatively simple, low cost phased array antenna can be fabricated. In particular, the antenna element modules 8 can be fabricated separately from the multi-layer substrate 10, and mounted on the multi-layer substrate 10. Additionally, by implementing the IC chips 14 in the antenna element modules 8, the need for IC chips within the BFN circuit 18 and/or the bottom surface of the multi-layer substrate 10 is obviated, thereby reducing the complexity of the BFN circuit 18. For example, inclusion of the IC chips 14 in the antenna element modules 8, avoids PCB complexities arising from routing a received signal through the multi-layer substrate 10 to an IC chip mounted on an opposing (bottom) surface, and then to the BFN circuit 18 for combining. Including the IC chips 14 in the antenna element modules 8 also reduces the signal losses between the IC chips 14 and the radiating element 12 as compared to having an IC chip mounted on the bottom surface of the multi-layer substrate 10, which can improve performance.

Figure 2:
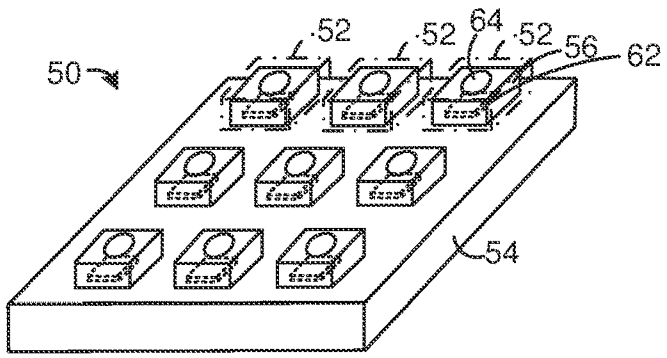
FIG. 2 illustrates a plan view of an example phased array antenna with a split-level architecture.
Figure 3:
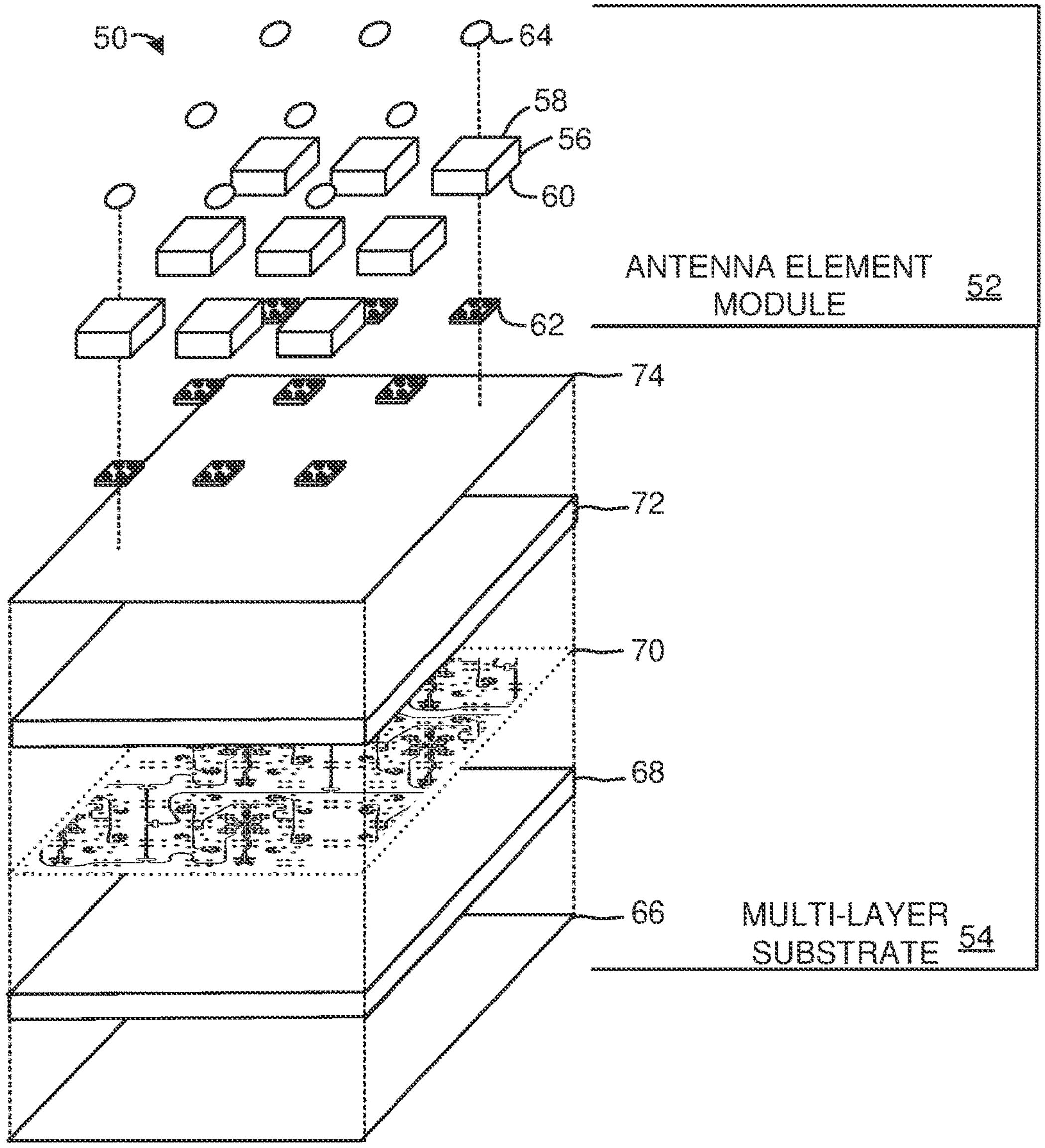
FIG. 3 illustrates an exploded view of the example phased array antenna of FIG. 1.

FIG. 2 is a plan view of an example phased array antenna 50 with a split-level architecture for transmitting and/or receiving radio frequency (RF) signals. FIG. 3 is an exploded diagram of the phased array antenna 50. FIGS. 2 and 3 employ the same reference numbers to denote the same structure. Moreover, unless noted otherwise, reference to elements of the phased array antenna 50 applies to both FIGS. 2 and 3. The phased array antenna 50 of FIGS. 2 and 3 can be employed to implement the phased array antenna 2 of FIG. 1.

In some examples, the phased array antenna 50 can be fabricated as modules and assembled. In particular, the phased array antenna 50 can include N number of antenna element modules 52 (only some of which are labeled in detail in FIGS. 1 and 2) mounted on a multi-layer substrate 54. Each antenna element module 52 can include a dielectric substrate 56 with an upper surface 58 and a lower surface 60. The dielectric substrate 56 can include one or more layers and can be implemented, for example, as a circuit board or a wide-angle impedance matching metamaterial (WAIM).

A plurality of IC chips 62 embedded in the phased array antenna 50 can be positioned on an intermediate layer of the phased array antenna 50. An IC chip 62 of the plurality of IC chips 62 can be adhered (mounted) on each of the antenna element modules 52. In particular, the IC chip 62 can be adhered (mounted) on the lower surface 60 of each dielectric substrate 56. Each IC chip 62 can be adhered (mounted) on a dielectric substrate 56 of a corresponding antenna element module 52 using flip-chip soldering techniques, wire bonding, such as thermionic bonding techniques or other techniques.

Additionally, each antenna element module 52 can include a radiating element 64. In some examples, the radiating element 64 can be disposed on the upper surface 58 of the dielectric substrate 56. In other examples, the radiating element 64 can be integrated with the dielectric substrate 56. In some examples, an embedded feedline extending through the dielectric substrate 56 can interconnect the radiating element 64 and the IC chip 62. In some examples, the radiating element 64 can be implemented as a patch antenna that can be formed on the upper surface 58 of the dielectric substrate 56. In such a situation, the patch antenna can be formed by etching away a portion a thin metal layer on the dielectric substrate 56, with the un-etched portion forming the patch antenna. In other examples, the radiating element 64 can be implemented as a microstrip antenna, such as a slot antenna fabricated on the dielectric substrate 56 via metallization. Additionally, in some examples, the radiating element 64 can be representative of a single radiating element. In this situation, there is a one-to-one correspondence between IC chips 62 and radiating elements 64. In other examples, the radiating element 64 can be representative of multiple radiating elements. In such a situation, the corresponding IC chip 62 can include multiple circuit paths (with multiple circuit elements) to individually adjust signals communicated with each of the corresponding multiple radiating elements.

The multi-layer substrate 54 can be implemented, for example, as a multi-layer circuit board (e.g., as a lower circuit board). In some examples, the multi-layer substrate 54 can include a base conductive layer 66 (e.g., a ground plane) located at a bottom (or lowest layer) of the multi-layer substrate 54. The base conductive layer can include etchings and/or traces for that allow the multi-layer substrate 54 to communicate with external components, such as a local system with a controller and/or a power supply. A lower dielectric layer 68 overlays the base conductive layer 66. A beam-forming network (BFN) circuit 70 can be formed on a layer of the multi-layer substrate 54 (or multiple layers). In some examples, the BFN circuit 70 can be formed on an interior layer of the multi-layer substrate 54. In an example where the BEN circuit 70 can be formed on an interior layer, the BFN circuit 70 overlays the lower dielectric layer 68. Moreover, an upper dielectric layer 72 overlays the BFN circuit 70. In this manner, the BFN circuit 70 can be sandwiched between the lower dielectric layer 68 and the upper dielectric layer 72, such that the BFN circuit 70 can be electrically shielded from electromagnetic interference (EMI). A top conductive layer 74 overlays the upper dielectric layer 72. In other examples, the BFN circuit 70 can be formed at or near the top conductive layer 74 of the multi-layer substrate 54. In such a situation, BFN circuit 70 can be patterned in the top conductive layer 74.

The top conductive layer 74 can include patterned mounting interfaces (e.g., etchings and/or conductive pads) for receiving each of the N number of antenna element modules 52. Additionally, the top conductive layer 74 can include patterned conductive interfaces with vias to permit passage of signals between the BFN circuit 70 and the IC chips 62 and/or the dielectric substrates 56 of the N number of antenna element modules 52. The N number of antenna element modules 52 can be mounted on the top conductive layer 74 at the pattern mounting interfaces of the top conductive layer 74. In some examples, the N number of antenna element modules 52 can be arranged in an ordered array. In some examples, as explained in detail herein, each IC chip 62 can be mounted on the top conductive layer 74 with an electrical bonding material (e.g., solder). In other examples, the lower surface 60 of each dielectric substrate 56 can be mounted on the top conductive layer 74 with an electrical bonding material, and a traces and/or vias in each dielectric substrate 56 can couple a corresponding IC chip 62 to a connection pad on the top conductive layer 74.

The multi-layer substrate 54 can include vias extending there through for connecting components at different layers of the multi-layer substrate. 54. For instance, if the BFN circuit 70 can be formed on an interior layer of the multi-layer substrate 54, the multi-layer substrate 54 can include vias for electrically connecting the BFN circuit 70 to the antenna element modules 52. Such vias can be coupled to the BFN circuit 70 at signal interfaces to couple the antenna element modules 52 to the BFN circuit 70.

In some examples, the BFN circuit 70 can be a passive circuit. The BFN circuit 70 can be configured to divide/combine signals that can be communicated between the N number of antenna element modules 52 and an external component of the local system.

Additionally, each IC chip 62 of each antenna element module 52 can include circuit components to adjust a signal communicated between the radiating element 64 and the BFN circuit 70. In particular, each antenna element module 52 can filter, amplify and/or phase shift a signal communicated between the radiating element 64 and the BFN circuit 70. Moreover, in some examples, each IC chip 62 can be tuned for a particular corresponding radiating element 64. That is, a first IC chip 62 can be configured to apply a different gain and/or phase shift to a signal than a second IC chip 62. Additionally or alternatively, adjustment parameters (e.g., bandpass, gain and/or phase shift) of each IC chip 62 can be set by a controller operating at the local system.

As explained with respect to the phase array antenna 2 of FIG. 1, in one example, the phased array antenna 50 can operate in transmitting mode. Additionally or alternatively, the phased array antenna 50 can operate in receiving mode. In some examples, the phased array antenna 50 can be configured to operate in the receiving mode or transmitting mode exclusively. In other examples, the phased array antenna 50 can operate in half-duplex mode or polarization mode, switching between the receiving mode and the transmitting mode. In still other examples, the phased array antenna 50 can operate in a frequency division duplex mode, wherein the phased array antenna 50 can operate in the transmitting mode and the receiving mode concurrently.

By implementing the phased array antenna 50, a relatively simple, low cost phased array antenna can be provided. In particular, the split-level architecture of the phased array antenna 50 reduces the number of layers needed to implement the multi-layer substrate 54. The split-level architecture of the phased array antenna 50 can permit each dielectric substrate 56 and the multi-layer substrate 54 to have a relatively low complexity (e.g., blind vias can be avoided), and thus the entire phased array antenna 50 can be lower cost as compared to use of a single circuit board. Additionally, integration of the IC chips 62 with antenna element module 52 positions the IC chips 62 in relatively close proximity with the radiating elements 64. Accordingly, via lengths between the IC chips 62 and the radiating elements 64 can be reduced.

Additionally, by reducing the complexity of the multi-layer substrate 54, simple, inexpensive techniques can be employed to fabricate the multi-layer substrate 54. In particular, by arranging the IC chips 62 separate from the multi-layer substrate 54, the number of vias needed to implement the phased array antenna 50 can be curtailed, such that the density of the vias within the multi-layer substrate 54 can be reduced. Accordingly, this reduces and/or eliminates the need to backdrill the vias with (with relatively complicated and expensive) controlled depth drilling techniques.

Furthermore, as noted above, each antenna element module 52 can be mounted on patterned conductive interfaces of the top conductive layer 74 of the multi-layer substrate 54. The pattern of the top conductive layer 74 defines locations of the N number of antenna element modules 52. Accordingly, the N number of antenna element modules 52 can be fabricated at a different time and/or facility from the multi-layer substrate 54. Additionally the arrangement of the antenna element modules 52 on the top conductive layer 74 of the multi-layer substrate 54 is such that each of the antenna element modules 52 can be separated with free space (e.g., air or a void), which avoids a continuous dielectric material between the radiating elements 64. In this manner, unwanted surface wave propagation of signals is suppressed/curtailed (reduced and/or eliminated), thereby elevating a performance (signal to noise ratio) of the phased array antenna 50. For example, surface waves that would otherwise propagate parallel with a continuous surface of dielectric material can be suppressed/curtailed. In particular, the pattern of the top conductive layer 74 ensures that a free space gap separates each IC chip 52. These free space gaps introduce index of refraction discontinuities in the top conductive layer 74 between the IC chips 62. These index of refraction discontinuities reduce the propagation of surface waves across the top conductive layer 74.

Figure 4:
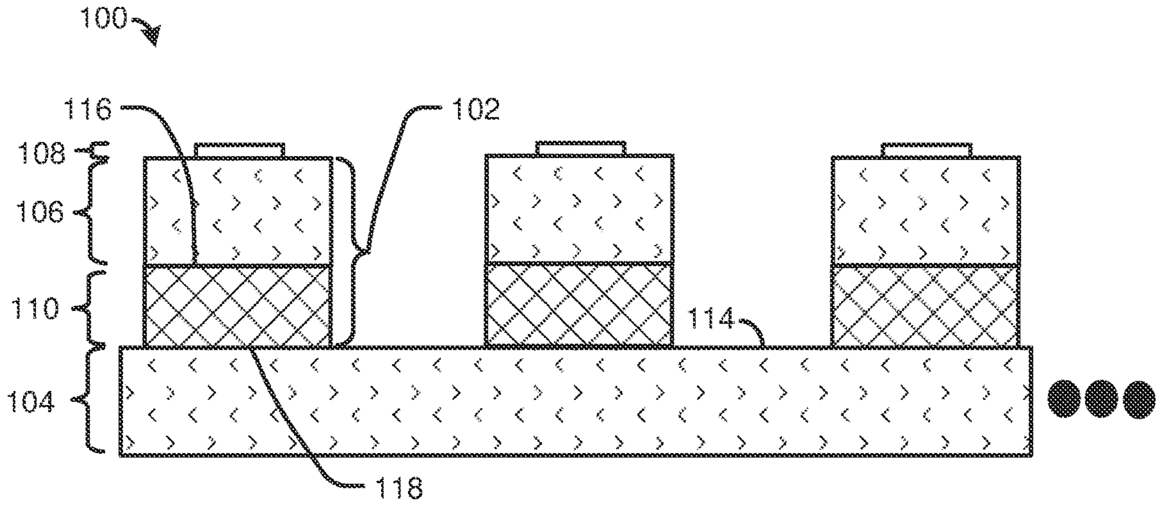
FIG. 4 illustrates a portion of an example phased array antenna with a first architecture.

FIG. 4 illustrates a portion of an example phased array antenna 100 with an example architecture for mounting a plurality of antenna element modules 102 on a multi-layer substrate 104. The phased array antenna 100 can be employed to implement the phased array antenna 2 of FIG. 1 and/or the phased array antenna 50 of FIGS. 2 and 3. Each antenna element module 102 can include a dielectric substrate 106 with a radiating element 108 disposed on or integrated with the dielectric substrate 106. Each radiating element 108 can be implemented, for example, as a patch antenna or a slot antenna.

An IC chip 110 can be adhered (mounted) to a lower surface of the dielectric substrate 106. Each IC chip 110 can be adhered (mounted) to a top surface 114 (e.g., a conductive layer) of the multi-layer substrate 104. Each IC chip 110 can be adhered to the top surface 114 of the multi-layer substrate 104 via an electrical bonding material (e.g., solder). The multi-layer substrate 104 can include circuits such as a BFN circuit. Additionally, the multi-layer substrate 104 can be coupled to power circuits and/or controllers that can provide signals to the IC chips 110. In some examples, each IC chip 110 can include an upper IC chip interface 116 that can provide a signal interface between the dielectric substrate 106 and the IC chip 110. Additionally, each IC chip 110 can include a lower IC chip interface 118 that can provide a signal interface between the IC chip 110 and the multi-layer substrate 104. The IC chips 110 can include one or more through-chip vias (e.g., through-silicon vias (TSVs)) that pass completely through the IC chips 110 to provide conductive interfaces at both interfaces 118, 116. In some examples, the lower IC chip interface 118 can be coupled to circuits in the multi-layer substrate 104 (such as a BFN circuit) through vias. For instance, a solder joint between solder pads on the top surface 114 of the multi-layer substrate 104 and each IC chip 110 can provide the direct electrical connection. In this manner, each IC chip 110 can be directly coupled to the multi-layer substrate 104. In operation, each IC chip 110 interposes signals communicated between a corresponding radiating element 108 and the multi-layer substrate (including the BFN circuit). Specifically, the signals communicated between each IC chip 110 and the multi-layer substrate 114 can pass through the lower IC chip interface 118. Additionally, the signals communicated between the IC chip 118 and the radiating element 108 can pass through the upper IC chip interface 116. Each IC chip 110 can adjust (e.g., amplify, filter and/or phase shift) signals communicated between the multi-layer substrate 104 and the dielectric substrate 106.

By employment of the architecture illustrated for the phased array antenna 100 of FIG. 4, a direct electrical connection between the multi-layer substrate 104 and the IC chip 110 can be achieved. In this manner, the IC chips 110 of the antenna element modules 102 can be directly coupled to vias and/or traces connected the BFN circuit and/or power and control systems of the multi-layer substrate 104. The architecture of the phased array antenna 100 of FIG. 4 curtails losses by positioning each IC chips 110 in relatively close proximity to the radiating element 158. Further, in some examples, such losses can be further curtailed by providing the direct electrical connection between the multi-layer substrate 104 and the IC chip 110.

Additionally or alternatively, the upper IC chip interface 116 can be configured to provide capacitive coupling between the dielectric substrate 106. That is, in some examples, some portion (or all) of the upper IC chip interface 116 can be designed to not provide a direct electrical contact, but still provide a capacitive plate for the capacitive coupling. Additionally or alternatively, the lower IC chip interface 118 can be configured to provide capacitive coupling between the dielectric substrate 106. That is, in some examples, some portion (or all) of the lower IC chip interface 118 can be designed to not provide a direct electrical contact, but still provide for the capacitive coupling.

Figure 5:
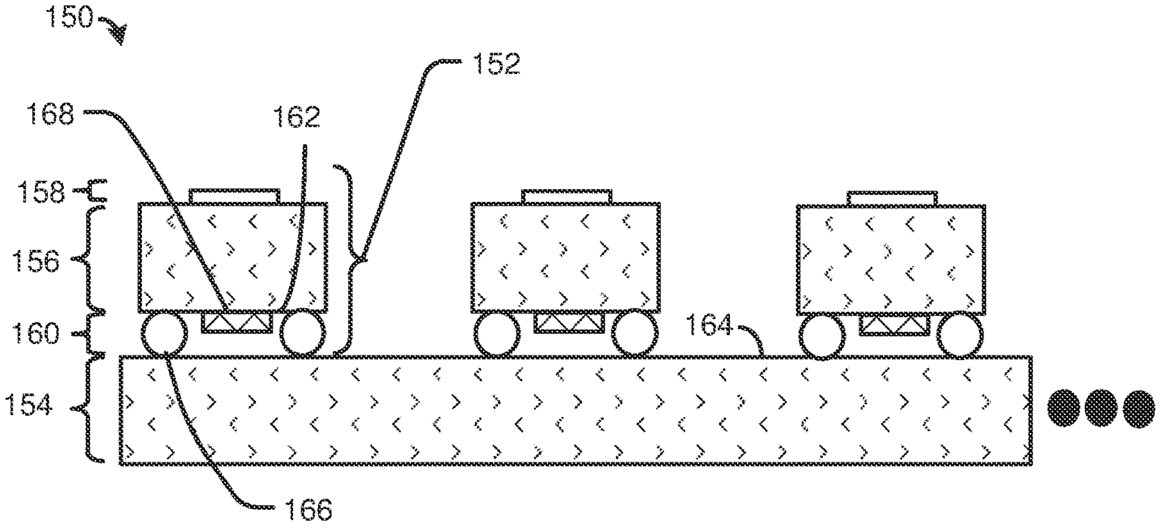
FIG. 5 illustrates a portion of an example phased array antenna with a second architecture.

FIG. 5 illustrates a portion of an example phased array antenna 150 with another example architecture for mounting a plurality of antenna element modules 152 on a multi-layer substrate 154. The phased array antenna 150 can be employed to implement the phased array antenna 2 of FIG. 1 and/or the phased array antenna 50 of FIGS. 2 and 3. Each antenna element module 152 can include a dielectric substrate 156 with a radiating element 158 disposed on the dielectric substrate 156. Each radiating element 158 can be implemented, for example, as a patch antenna or a slot antenna.

An IC chip 160 can be mounted to a lower surface 162 of the dielectric substrate 156. Each dielectric substrate 156 can be mounted to a top surface 164 (e.g., a conductive layer) of a multi-layer substrate 154 through a conductive bonding material 166, such as solder balls or pillars. Each IC chip 160 can be spaced apart from the top surface 164 of the multi-layer substrate 154. In other words, a free space gap (e.g., air or a void) can separate a surface of each IC chip 160 from the top surface 164 of the multi-layer substrate 154. Additionally, the amount of conductive bonding material 166 (e.g., solder) can provide a desired spacing (e.g., a size of the free space gap) between the IC chips 160 and the multi-layer substrate 154. In some examples, each IC chip 160 can be circumscribed by a corresponding dielectric substrate 156. In such a situation, an electrical connection formed by the conductive bonding material 166 can be formed near a periphery of the corresponding dielectric substrate 156.

The multi-layer substrate 154 can include circuits such as a BFN circuit. Additionally, the multi-layer substrate 154 can be coupled to power circuits and/or controllers that can provide signals to the IC chips 160. In operation, each IC chip 160 can adjust (e.g., amplify, filter and/or phase shift) signals communicated between the multi-layer substrate 154 and the radiating element 158.

In some examples, each IC chip 160 can include an IC chip interface 168 that can provide a conductive interface between the dielectric substrate 156 and the IC chip 160. In some examples, each IC chip 110 can be flipped and attached to the lower surface 162 of the dielectric substrate 156. This architecture curtails losses by positioning the IC chip 160 in relatively close proximity to the radiating element 158. Additionally, the dielectric substrate 156 can include vias and/or traces that provide an electrical path between the multi-layer substrate 154 and the IC chip 160. In this manner, signals provided from the multi-layer substrate 154 to the IC chip 160 can be routed through the dielectric substrate 156. Specifically, signals communicated between the multi-layer substrate 150 and an IC chip 160 can pass through the conductive bonding material 166, through the vias and/or traces of the dielectric substrate 156 and through the IC chip interface 168. Additionally, signals communicated between the IC chip 160 and the radiating element 158 can pass through the IC chip interface 168 and through the dielectric substrate 156.

By employment of the architecture illustrated for the phased array antenna 150 of FIG. 5, an electrical path between the multi-layer substrate 154 and the IC chip 160 can be achieved with the single IC interface 168 on one side of the IC chip 160. By employment of the architecture illustrated for the phased array antenna 150 of FIG. 5, the IC chip 160 of each antenna element module 102 can be indirectly coupled to vias and/or traces connected the BFN circuit and/or power and control systems of the multi-layer substrate 154.

Figure 6:
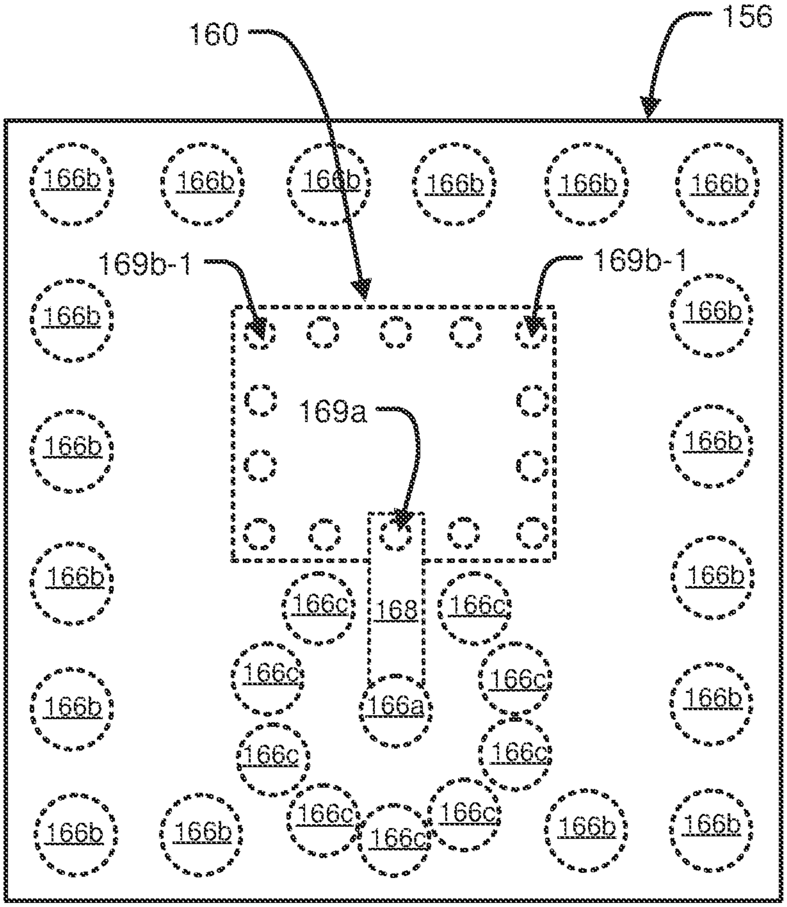
FIG. 6 illustrates an example top view of an antenna element module of the phased array antenna of FIG. 5.

FIG. 6 illustrates an example top view of an antenna element module 152 of the phased array antenna 150 of FIG. 5. The illustrated example includes various groups of conductive bonding material 166 (e.g., solder balls, pillars, etc.) between the lower surface 156 of the dielectric substrate 156 and the multi-layer substrate (not shown in FIG. 6; see FIG. 5 ref. no. 154).

In the illustrated example, conductive bonding material **166*b* is arranged along the periphery of the lower surface of the dielectric substrate 156. The conductive bonding material 166 can provide the desired spacing between the IC chip 160 and multi-layer substrate as discussed above with respect to FIG. 5. Some or all of the conductive bonding material 166*b* can be coupled to ground to provide shielding of the IC chip 160 from external electromagnetic sources. As another example, one or more of the conductive bonding material 166*b* may be coupled to a supply voltage (or multiple supply voltages) that is used to provide power for the IC chip 160 through one or more conductive traces (not shown) coupled to a corresponding port of the IC chip. As yet another example, one or more of the conductive bonding material 166*b* may be coupled to a control line in the multi-layer substrate to provide control signals to the IC chip 160 through a conductive trace (not shown) coupled to a corresponding port of the IC chip. Although shown in the illustrated example as being arranged along the periphery, in other examples the conductive bonding material 166*b*** can be arranged in a different manner.

In the illustrated example, the electrical path for communication of signals between the multi-layer substrate and a port (e.g., a pad, lead, etc.) on the IC chip 160 is provided through conductive bonding material **166*a*, conductive trace 168, and conductive bonding material (e.g., solder, etc.) 169*a*. As such, the conductive bonding material 166*a* extends between the top surface of the multi-layer substrate to the conductive trace 168 (e.g., patterned metal material) on the bottom surface of the dielectric substrate 156. The conductive bonding material 166*a* is surrounded by conductive bonding material 166*c* coupled to ground to provide shielding. The conductive trace 168 extends between the conductive bonding material 166*a* and conductive bonding material 169*a* which is adhered to the port on the IC chip 160**. Alternatively, the manner in which the electrical path is established may be different.

In the illustrated example, the electrical path for communication of signals between one or more ports of the IC chip 160 and the radiating element (not shown) is provided by conductive bonding material (e.g., solder) **169*b* that extends between the bottom surface of the dielectric substrate 156 and the upper surface of the IC chip 160. In the illustrated example, the radiating element is a dual-polarized antenna having two ports and thus a first signal (e.g., corresponding to horizontal polarization) is communicated between a first port of the IC chip 160 and a first port of the radiating element through conductive bonding material 169*b*-1, and a second signal (e.g., corresponding to vertical polarization) is communicated between a second port of the IC chip 160 and a second port of the radiating element through conductive bonding material 169*b*-1**. Alternatively, the manner in which the electrical path is established between the IC chip and radiating element may be different.

In the illustrated example, additional conductive bonding material is arranged along the periphery of the IC chip 160 to provide additional electrical paths between other ports on the IC chip 160 and the multi-layer substrate, such as to provide ground, DC supply voltage(s), etc. through conductive bonding material **166*b*** and conductive traces (not shown) as mentioned above.

Figure 7:
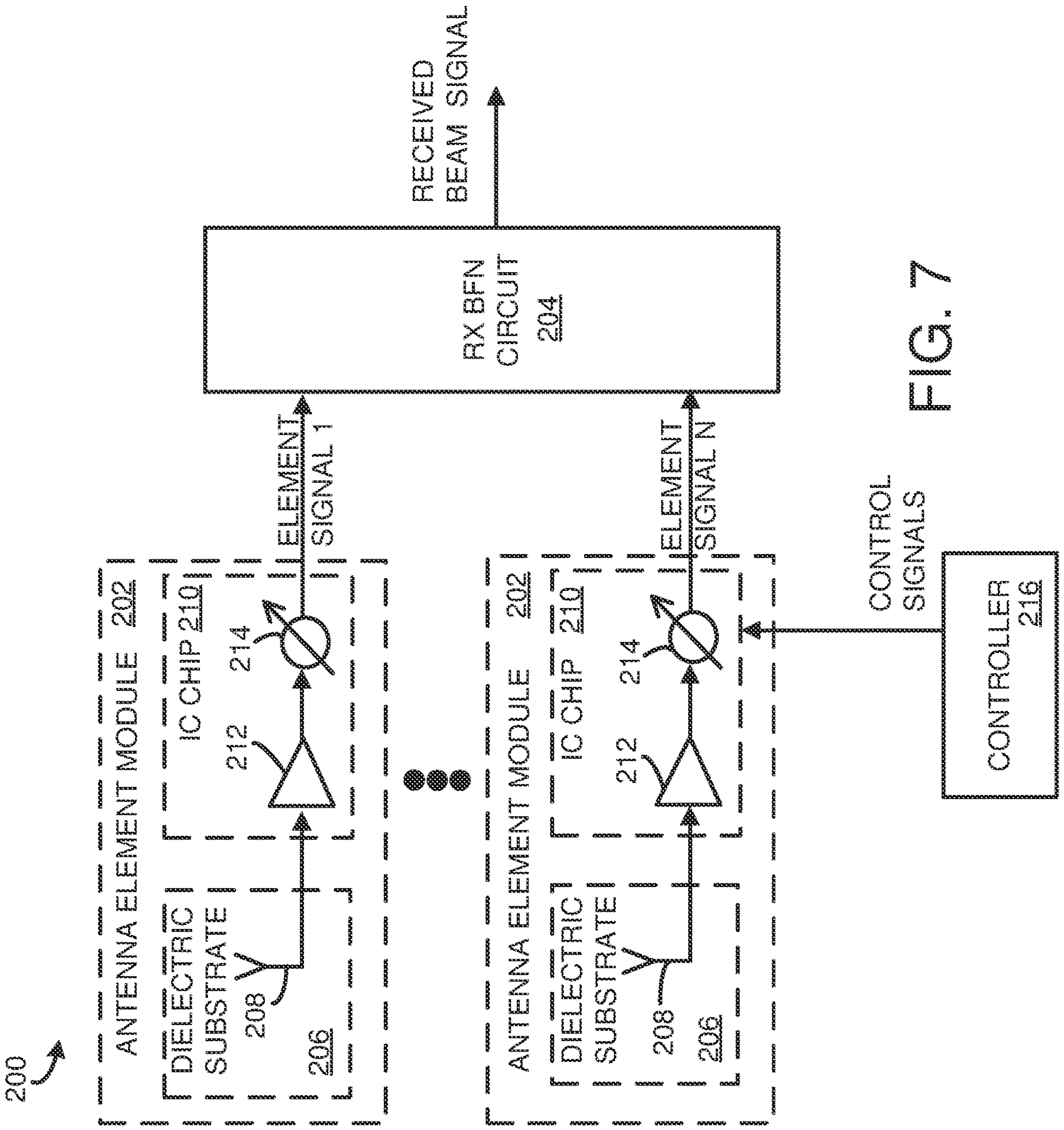
FIG. 7 illustrates a block diagram of an example phased array antenna operating in receiving mode.

FIG. 7 illustrates a block diagram of an example phased array antenna 200 that depicts the logical interconnection of the phased array antenna 2 of FIG. 1 and/or the phased array antenna 50 of FIGS. 2 and 3 operating in receiving mode. Moreover, the architecture of the phased array antenna 100 of FIG. 4 or the architecture of the phased array antenna 150 of FIG. 5 could be employed to implement the phased array antenna 200 of FIG. 7. In the illustrated example, N number of antenna element modules 202 communicate with a receiving (RX) BFN circuit 204.

Each of the N number of antenna element modules 202 can include a dielectric substrate 206 with a radiating element 208 (e.g., a patch antenna or a slot antenna) disposed on or integrated with the dielectric substrate. Each of the N number of antenna element modules 202 also can include an IC chip 210. In the illustrated example, each IC chip 210 can include an amplifier 212 and a phase shifter 214. The IC chips 210 can receive control signals from a controller 216 that can be implemented on an external system (e.g., a local system). In some examples, the control signals can control a gain of each amplifier 212 and/or a phase shift applied by each phase shifter 214. Thus, in some examples, each amplifier 212 can be implemented as a variable gain amplifier, a switched attenuator circuit, etc.

In operation, an RF signal received by each of the N number of radiating elements 208 (or some subset thereof) can be converted into an electrical signal and provided to a corresponding IC chip 210 for adjustment. Each amplifier 212 of the IC chips 210 amplifies the provided electrical signal and each phase shifter 214 can apply a phase shift to output N number of element signals, which can alternatively be referred to as adjusted signals. In some examples of the phased array antenna 100 of FIG. 7, the phase shifters 214 can apply a variable amount of phase adjustment in response to the control signals provided from the controller 216. Additionally or alternatively, the amplifiers 212 can provide a variable amount of amplitude adjustment in response to the control signals provided from the controller 216. The N number of element signals can be provided to the RX BFN circuit 204. The RX BFN circuit 204 can combine the N number of element signals to form a received beam signal that can be provided to the local system for demodulating and processing.

Figure 8:
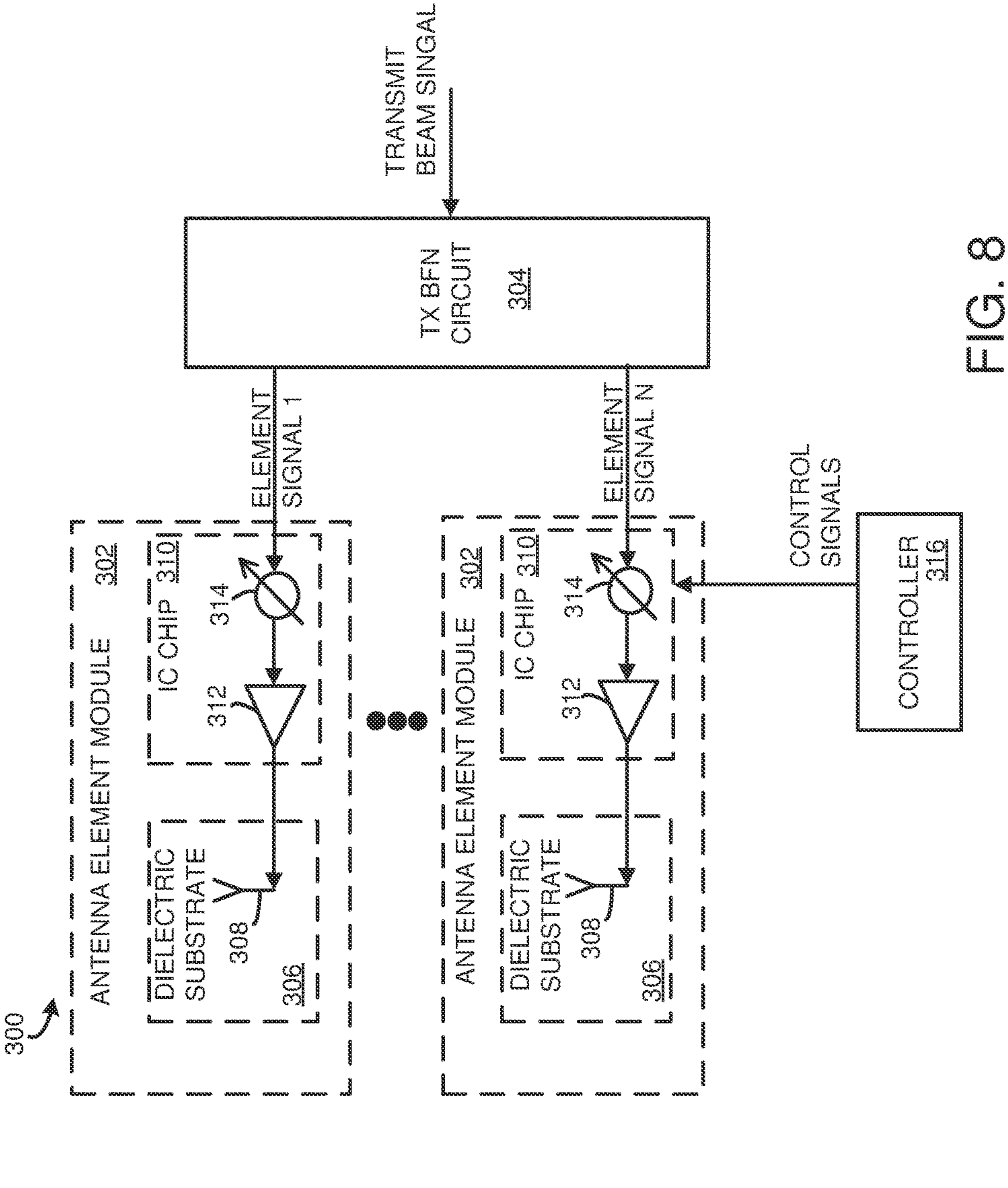
FIG. 8 illustrates a block diagram of an example phased array antenna operating in transmitting mode.

FIG. 8 illustrates a block diagram of a phased array antenna 300 that depicts the logical interconnection of the phased array antenna 2 of FIG. 1 and/or the phased array antenna 50 of FIGS. 2 and 3 operating in transmitting mode. Moreover, the architecture of the phased array antenna 100 of FIG. 4 or the architecture of the phased array antenna 150 of FIG. 5 could be employed to implement the phased array antenna 300 of FIG. 8. In the illustrated example, N number of antenna element modules 302 communicate with a transmitting (TX) BFN circuit 304.

Each of the N number of antenna element modules 302 can include a dielectric substrate 306 with a radiating element 308 (e.g., a patch antenna or a slot antenna) disposed on or integrated with the dielectric substrate 306. Each of the N number of antenna element modules 302 also can include an IC chip 310. In the illustrated example, each IC chip 310 can include an amplifier 312 and a phase shifter 314. The IC chips 310 can receive control signals from a controller 316 that can be implemented on an external system (e.g., a local system). In some examples, the control signals can control a variable amount of amplitude adjustment applied by each amplifier 312 and/or a variable amount of phase adjustment applied by each phase shifter 314. Thus, in some examples, each amplifier 312 can be implemented as a variable gain amplifier, a switched attenuator circuit, etc.

In operation, a transmit beam signal can be provided from the local system to the TX BFN circuit 304. The TX BFN circuit 304 divides the transmit beam signal into N number of element signals that can be provided to the N number of antenna element modules 302. Each IC chip 310 of the N number of antenna element modules 302 can adjust a corresponding element signal to generate an adjusted signal that can be provided to a corresponding radiating element 308. In the example illustrated, the adjusting can include the phase shifter 314 phase shifting the element signal and the amplifier 312 amplifying the element signal. Each radiating element 308 propagates the corresponding adjusted as an RF signal into free space.

Figure 9:
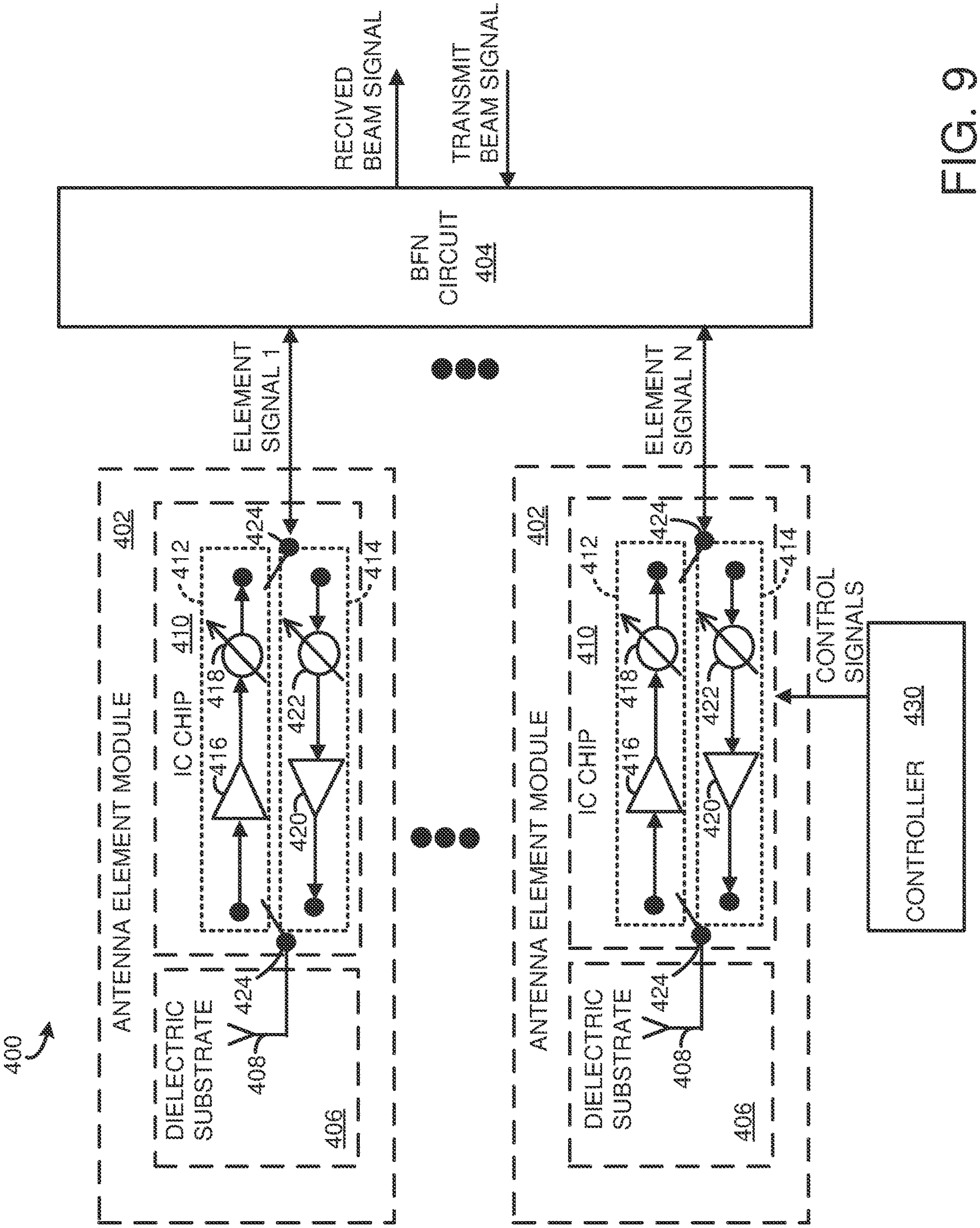
FIG. 9 illustrates a block diagram of an example phased array antenna operating in half-duplex mode.

FIG. 9 illustrates a block diagram of a phased array antenna 400 that depicts the logical interconnection of the phased array antenna 2 of FIG. 1 and/or the phased array antenna 50 of FIGS. 2 and 3 operating in half-duplex mode. Moreover, the architecture of the phased array antenna 100 of FIG. 4 or the architecture of the phased array antenna 150 of FIG. 5 could be employed to implement the phased array antenna 400 of FIG. 9. In half-duplex mode, the phased array antenna 400 switches between a receiving mode and a transmitting mode. In the illustrated example, N number of antenna element modules 402 communicate with a BFN circuit 404.

Each of the N number of antenna element modules 402 can include a dielectric substrate 406 with a radiating element 408 (e.g., a patch antenna or a slot antenna) that can be disposed or integrated with the dielectric substrate. Each of the N number of antenna element modules 402 also can include an IC chip 410. In the illustrated example, each IC chip 410 can include a receiving path 412 and a transmitting path 414. The receiving path 412 can include a receiving amplifier 416 and a receiving phase shifter 418 for adjusting signals received from a corresponding radiating element 408. Similarly, the transmitting path 414 can include a transmitting amplifier 420 and a transmitting phase shifter 422 for adjusting a corresponding element signal provided from the BFN circuit 404.

Each IC chip 410 also can include switches 424 (e.g., transistor switches) for switching between the receiving mode and the transmitting mode. The IC chips 410 can receive control signals from a controller 430 that can be implemented on an external system (e.g., a local system). The control signals can control a state of the switches 424 to switch the phased array antenna 400 from the receiving mode to the transmitting mode, or vice-versa. Additionally, in some examples, the control signals provided from the controller 430 can control a variable amount of amplitude adjustment applied by each receiving amplifier 416 and each transmitting amplifier 420. Thus, in some examples, each receiving amplifier 416 and each transmitting amplifier 420 can be implemented as a variable gain amplifier, a switched attenuator circuit, etc. Similarly, in some examples, the control signals provided from the controller 430 can control a variable amount of phase adjustment applied by each receiving phase shifter 418 and each transmitting phase shifter 422.

In operation in the receiving mode, the controller 430 sets the switches 424 of the IC chips 410 to route signals through the receiving path 412. Moreover, in the receiving mode an RF signal received by each of the N number of radiating elements 408 (or some subset thereof) can be provided to a corresponding IC chip 410 for adjustment. Each receiving amplifier 416 of the IC chips 410 amplifies the provided signal and each receiving phase shifter 418 applies a phase shift to output N number of element signals, which can alternatively be referred to as adjusted signals. The N number of element signals can be provided to the BFN circuit 404. The BFN circuit 404 can combine the N number of element signals to form a received beam signal that can be provided to the local system for demodulating and processing.

In operation in the transmitting mode, the controller 430 sets the switches 424 to the transmitting path 414 to transmit a beam signal can be provided from the local system to the BFN circuit 404. The BFN circuit 404 divides the transmit beam signal into N number of element signals that can be provided to the N number of antenna element modules 402. Each IC chip 410 of the N number of antenna element modules 402 can adjust a corresponding element signal to generate an adjusted signal that can be provided to a corresponding radiating element 408. In the example illustrated, the adjusting can include the transmitting phase shifter 422 phase shifting the element signal and the transmitting amplifier 420 amplifying the element signal. Each radiating element 408 propagates the corresponding adjusted signal as an RF signal into free space.

In the half-duplex mode, the phased array antenna 400 switches between the receiving mode and the transmitting mode. In this manner, the same antenna element modules 402 can be employed for both the transmission and the reception of RF signals.

Figure 10:
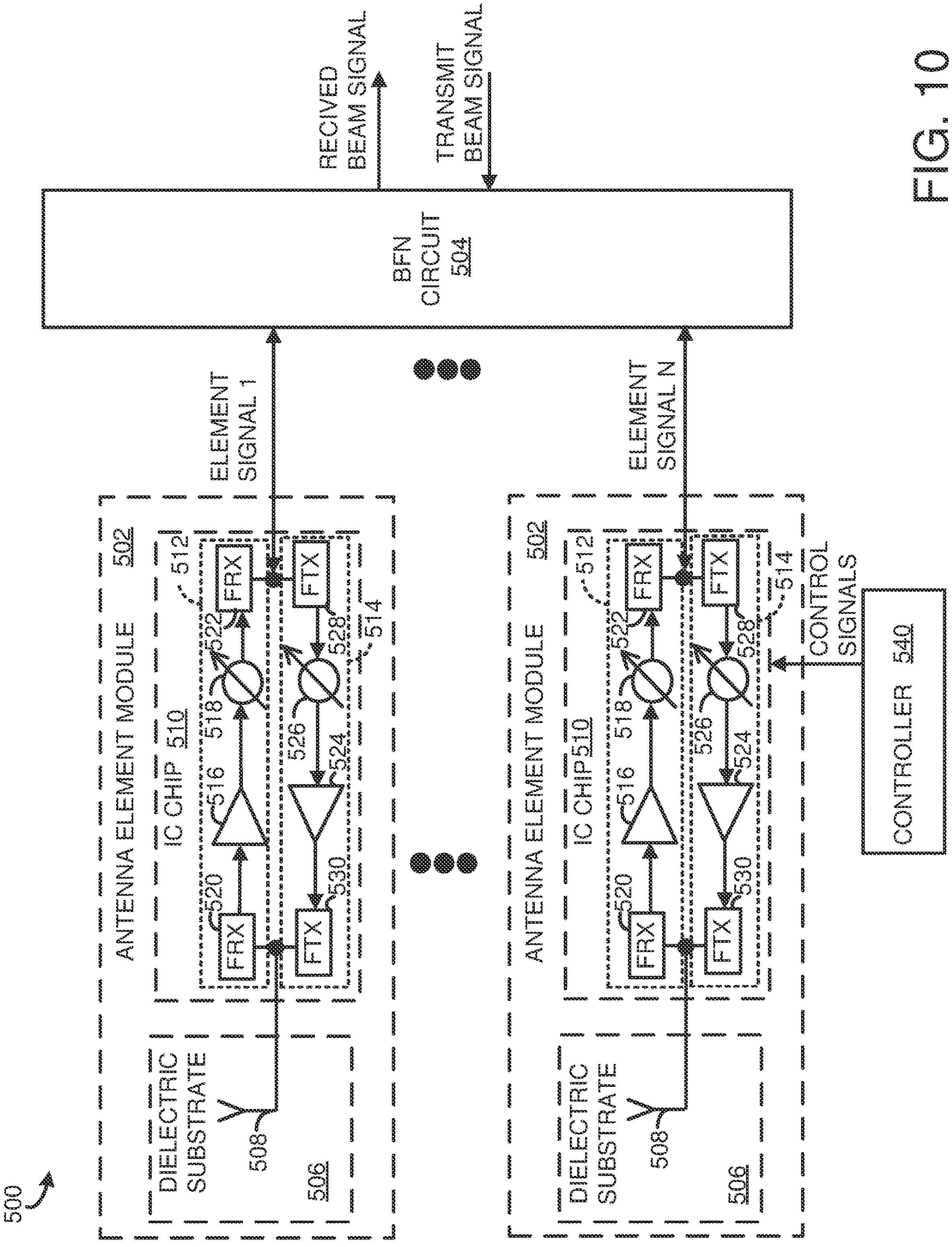
FIG. 10 illustrates a block diagram of an example phased array antenna operating in frequency division duplex mode.

FIG. 10 illustrates a block diagram of a phased array antenna 500 that depicts the logical interconnection of the phased array antenna 2 of FIG. 1 and/or the phased array antenna 50 of FIGS. 2 and 3 operating in frequency division duplex mode. Moreover, the architecture of the phased array antenna 100 of FIG. 4 or the architecture of the phased array antenna 150 of FIG. 5 could be employed to implement the phased array antenna 500 of FIG. 10. In frequency division duplex mode, the phased array antenna 500 can include circuitry for processing RF signals received within a receiving band and for propagating RF signals in a transmitting band.

In the illustrated example, N number of antenna element modules 502 communicate with a BFN circuit 504. Each of the N number of antenna element modules 502 can include a dielectric substrate 506 with a radiating element 508 (e.g., a patch antenna or a slot antenna) disposed or integrated with the dielectric substrate 506. Each of the N number of antenna element modules 502 also can include an IC chip 510. In the illustrated example, each IC chip 510 can include a receiving path 512 and a transmitting path 514. The receiving path 512 can include a receiving amplifier 516 and a receiving phase shifter 518 for adjusting signals received from a corresponding radiating element 508. Additionally, the receiving path 512 can include an input receiving filter 520 and an output receiving filter 522. The input receiving filter 520 and the output receiving filter 522 can be implemented as relatively narrow band pass filters that remove signals with frequencies outside the receiving band. Accordingly, the input receiving filter 520 and the output receiving filter 522 can have a passband set to the reconceiving band.

Similarly, the transmitting path 514 can include a transmitting amplifier 524 and a transmitting phase shifter 526 for adjusting a corresponding element signal provided from the BFN circuit 504. Additionally, the transmitting path 514 can include an input transmitting filter 528 and an output receiving filter 530. The input transmitting filter 528 and the output transmitting filter 530 can be implemented as relatively narrow band pass filters that remove signals with frequencies outside the transmitting band. Accordingly, the input transmitting filter 528 and the output transmitting filter 530 can have a passband set to the transmitting band.

The IC chips 510 can receive control signals from a controller 540 that can be implemented on an external system (e.g., a local system). In some examples, the control signals control the passband and/or a bandwidth of the input receiving filter 520 and the output receiving filter 522. Similarly, in some examples, the control signals provided from the controller 540 control and the passband and/or bandwidth of the input transmitting filter 528 and the output transmitting filter 530. Additionally or alternatively, the control signals provided from the controller 540 can control a variable amount of amplitude adjustment applied by each receiving amplifier 516 and each transmitting amplifier 524. Thus, in some examples, each receiving amplifier 516 and each transmitting amplifier 524 can be implemented as a variable gain amplifier, a switched attenuator circuit, etc. Similarly, in some examples, the control signals provided from the controller 540 can control a variable amount of phase adjustment applied by each receiving phase shifter 518 and each transmitting phase shifter 526.

In operation, the phased array antenna 500 can concurrently operate in a receiving mode and a transmitting mode based on a frequency of a signal traversing the phased array antenna 500. More specifically, RF signals can be received by each of the N number of radiating elements 508 (or some subset thereof), and these signals provided to a corresponding IC chip 510 for adjustment. A signal within the passband (the receiving band) of the input receiving filter 520 can be adjusted (e.g., amplified and phase shifted) by the receiving path of a corresponding IC chip 510. The adjusted signal can be filtered by the output receiving filter 522 and provided as an element signal to the BFN circuit 504. In this manner, the BFN circuit 504 receives N number of element signals from the N number of antenna element modules 502, wherein each of the received N number of element signals are within the receiving band.

Additionally, concurrently with the receiving of the RF signals, a transmit beam signal can be provided from the local system to the BFN circuit 504. The BFN circuit 504 divides the transmit beam signal into N number of element signals that can be provided to the N number of antenna element modules 502. The input transmitting filter 528 of each IC chip 510 of the N number of antenna element modules 502 removes signals outside of the passband (the transmitting band). Additionally, the transmitting path 514 can adjust (phase shift and amplify) a corresponding element signal to generate an adjusted signal that can be provided through the output transmitting filter 530 and to a corresponding radiating element 508. Each radiating element 508 propagates the corresponding adjusted as an RF signal into free space.

In the phased array antenna 500, the frequency of traversing signals controls the routing of signals through the phased array antenna 500. In this manner, the same antenna element modules 502 can be employed for both the transmission and the reception of RF signals. Additionally, in some examples, the phased array antenna 500 can have an architecture that intermittently switches between the transmitting mode and the receiving mode to provide half-duplexing.

Figure 11:
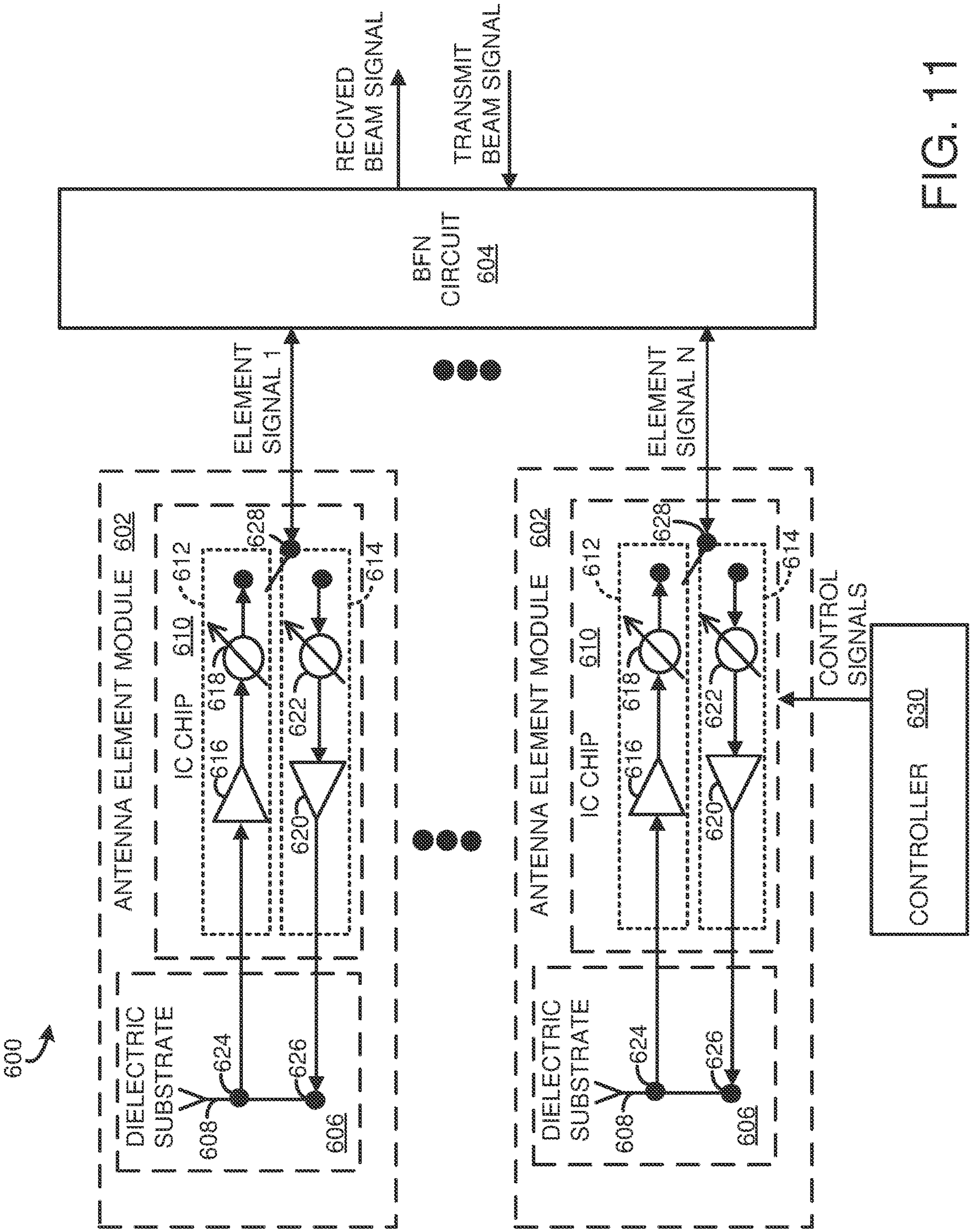
FIG. 11 illustrates a block diagram of an example phased array antenna operating in polarization duplex mode.

FIG. 11 illustrates a block diagram of a phased array antenna 600 that depicts the logical interconnection of the phased array antenna 2 of FIG. 1 and/or the phased array antenna 50 of FIGS. 2 and 3 operating in polarization duplex mode, which can be a particular configuration of half-duplex mode. In polarization duplex mode, the phased array antenna 600 can include circuitry for processing RF signals received with a first polarization and for propagating RF signals in a second polarization, orthogonal to the first polarization.

In the illustrated example, N number of antenna element modules 602 communicate with a BFN circuit 604. Each of the N number of antenna element modules 602 can include a dielectric substrate 606 with a radiating element 608 (e.g., a patch antenna or a slot antenna) disposed or integrated with the dielectric substrate 606. More particularly, in some examples, the radiating element 608 can be representative of a set of orthogonally arranged radiating elements, such as slot antennas. Each of the N number of antenna element modules 602 also can include an IC chip 610. In the illustrated example, each IC chip 610 can include a receiving path 612 and a transmitting path 614. The receiving path 612 can include a receiving amplifier 616 and a receiving phase shifter 618 for adjusting signals received from a corresponding radiating element 608. Similarly, the transmitting path 614 can include a transmitting amplifier 620 and a transmitting phase shifter 622 for adjusting a corresponding element signal provided from the BFN circuit 604.

The receiving path 612 can be coupled to a first port 624 of the radiating element 608 and the transmitting path 614 can be coupled to a second port 626 of the radiating element 608. The first port 624 of the radiating element 608 can be configured to output RF signals received at the radiating element 608 that are in a first polarization, and the second port 624 of the radiating element 608 can be configured to transmit signals received at the radiating element 608 with a second polarization, orthogonal to the first polarization. For instance, the first polarization can be vertical polarization and the second polarization can be horizontal polarization, or vice versa. Alternatively, the first polarization can be right hand circular polarization (RHCP) and the second polarization can be left hand circular polarization (LHCP) or vice versa.

Each IC chip 610 also can include a switch 628 (e.g., a transistor switch) for switching between the receiving mode and the transmitting mode. The IC chips 610 can receive control signals from a controller 630 that can be implemented on an external system (e.g., a local system). The control signals can control a state of the switches 628 to switch the phased array antenna 600 from the receiving mode to the transmitting mode, or vice-versa. Additionally, in some examples, the control signals provided from the controller 630 can control a variable amount of amplitude adjustment applied by each receiving amplifier 616 and each transmitting amplifier 620. Thus, in some examples, each receiving amplifier 616 and each transmitting amplifier 620 can be implemented as a variable gain amplifier, a switched attenuator circuit, etc. Similarly, in some examples, the control signals provided from the controller 630 can control a variable amount of phase adjustment applied by each receiving phase shifter 618 and each transmitting phase shifter 622.

In operation in the receiving mode, the controller 630 sets the switches 628 of the IC chips 610 to route signals through the receiving path 612. Moreover, in the receiving mode, an RF signal in the first polarization duplex mode received by each of the N number of radiating elements 608 (or some subset thereof) can be provided to a corresponding IC chip 610 for adjustment. Each receiving amplifier 616 of the IC chips 610 can amplify the provided signal and each receiving phase shifter 618 can apply a phase shift to output N number of element signals, which can alternatively be referred to as adjusted signals. The N number of element signals can be provided to the BFN circuit 604. The BFN circuit 604 can combine the N number of element signals to form a received beam signal that can be provided to the local system for demodulating and processing.

In operation in the transmitting mode, the controller 630 sets the switches 628 to the transmitting path 614 to transmit a beam signal that can be provided from the local system to the BFN circuit 604. The BFN circuit 604 divides the transmit beam signal into N number of element signals that can be provided to the N number of antenna element modules 602. Each IC chip 610 of the N number of antenna element modules 602 can adjust a corresponding element signal to generate an adjusted signal that can be provided to a corresponding radiating element 608. In the example illustrated, the adjusting can include the transmitting phase shifter 622 phase shifting the element signal and the transmitting amplifier 620 amplifying the element signal. Each radiating element 608 propagates the corresponding adjusted signal as an RF signal into free space.

In the polarization duplex mode, the phased array antenna 600 switches between the receiving mode and the transmitting mode. However, by leveraging the orthogonal relationship of signals at the first port 624 and signals at the second port 626 of the radiating elements 608, each antenna element module 602 can be implemented with a single switch 628 to reduce losses. Additionally, in this manner, the same antenna element modules 602 can be employed for both the transmission and the reception of RF signals.

Figure 12:
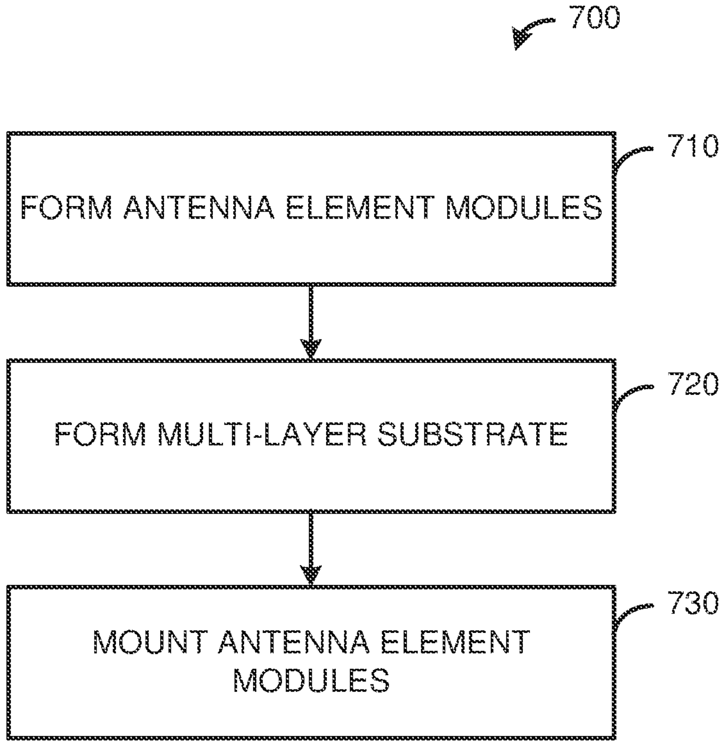
FIG. 12 illustrates a flow chart of an example method for fabricating a phased array antenna.

In view of the foregoing structural and functional features described above, an example method will be better appreciated with reference to FIG. 12. While, for purposes of simplicity of explanation, the example method of FIG. 12 is shown and described as executing serially, the present examples are not limited by the illustrated order, as some actions can in other examples occur in different orders, multiple times and/or concurrently from that shown and described herein. Moreover, it is not necessary that all described actions be performed to implement a method.

FIG. 12 illustrates a flowchart of an example method 700 for fabricating a phased array antenna. The method 600 can be employed, for example, to fabricate the phased array antenna 50 of FIG. 1 and/or the phased array antenna 100 of FIGS. 2 and 3.

At 710, a plurality of antenna element modules (e.g., the antenna element modules 52 of FIGS. 2 and 3) can be formed. Each antenna element module can include a dielectric substrate (e.g., a circuit board or WAIM layer) with a radiating element disposed on or integrated with the dielectric substrate (e.g., the radiating element 64 of FIGS. 2 and 3). Additionally, each antenna element module can include an IC chip adhered to a lower surface of the dielectric substrate.

At 720, a multi-layer substrate (e.g., the multi-layer substrate 54 of FIGS. 2 and 3) can be formed. The multi-layer substrate can be configured to underlie the plurality of antenna element modules. The multi-layer substrate can include a BFN circuit formed on a layer of the multi-layer substrate (e.g., an interior layer or other layer). Moreover, the multi-layer substrate can include vias and/or traces for providing electrical communication between the BFN circuit and the antenna element modules.

At 730, each of the plurality of antenna element modules can be mounted on the multi-layer substrate. The plurality of antenna element modules can be arranged in a spaced-apart configuration (e.g., an array) on a conductive layer (a top layer) of the multi-layer substrate. Moreover, an electrical bonding material (e.g., solder) can be applied to patterned mounting interfaces of the multi-layer substrate to facilitate the mounting. In this manner, the vias and/or traces in the multi-layer substrate electrically couples the IC chips of the antenna element modules with the BFN circuit.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A phased array antenna comprising:

an array of antenna element modules, each of the array of antenna element modules comprising:

a dielectric substrate having a lower surface with a conductive trace;

a radiating element disposed at an upper surface of the dielectric substrate; and an integrated circuit (IC) chip adhered to the lower surface of the dielectric substrate and connected to the conductive trace, the IC chip including a circuit to adjust a signal communicated with the radiating element through the dielectric substrate by phase shifting and/or amplifying the signal to steer a beam formed by the phased array antenna; and a lower substrate underlying the array of antenna element modules, the lower substrate including a beam forming network (BFN) circuit formed therein, the BFN circuit being in electrical communication with the IC chip of each of the array of antenna element modules through the conductive trace of the respective antenna element module without a blind via within the dielectric substrate.

2. The phased array antenna of claim 1, wherein the IC chip of each of the array of antenna element modules is electrically coupled to the lower substrate and the conductive trace of each respective dielectric substrate.

3. The phased array antenna of claim 2, wherein a surface of the lower substrate and the conductive trace of each respective dielectric substrate are electrically coupled through bonding material.

4. The phased array antenna of claim 3, wherein each instance of the bonding material that electrically couples the surface of the lower substrate and the conductive trace of each respective dielectric substrate is surrounded by conductive bonding material coupled to ground.

5. The phased array antenna of claim 1, wherein the radiating element of each of the array of antenna element modules is a first radiating element, and each of the array of antenna element modules further comprises:

a second radiating element, wherein a corresponding IC chip includes another circuit to adjust a signal communicated with the second radiating element.

6. The phased array antenna of claim 1, wherein the BFN circuit is a passive circuit that at least one of divides and combines signals in-phase that are communicated with the radiating element of each of the array of antenna element modules.

7. The phased array antenna of claim 1, wherein each of the array of antenna element modules further comprises a feedline that interconnects a corresponding IC chip and a radiating element of a respective antenna element module.

8. The phased array antenna of claim 7, wherein the radiating element of each of the array of antenna element modules is selected from a group consisting of a patch antenna disposed on a corresponding dielectric substrate, a patch antenna integrated with a corresponding dielectric substrate, a slot antenna disposed on a corresponding dielectric substrate and a slot antenna integrated with a corresponding dielectric substrate.

9. The phased array antenna of claim 1, wherein the dielectric substrate of each antenna element module is interconnected with a surface of the lower substrate with an electrical connection formed through electrical bonding material.

10. The phased array antenna of claim 9, wherein the IC chip of each antenna element module of the array of antenna element modules is spaced apart from the surface of the lower substrate.

11. The phased array antenna of claim 9, wherein the IC chip of each antenna element module of the array of antenna element modules is circumscribed by a corresponding dielectric substrate, and the electrical connection between the corresponding dielectric substrate and the surface of the lower substrate is formed near a periphery of the corresponding dielectric substrate.

12. The phased array antenna of claim 1, wherein a top layer of the lower substrate has a pattern that defines locations of the array of antenna element modules and the pattern separates each of plurality of antenna element modules with free space to suppress surface waves propagating across a surface of the lower substrate.

13. The phased array antenna of claim 1, wherein the BFN circuit is coupled to the array of antenna element modules through a plurality of vias or a plurality of conductive traces.

14. The phased array antenna of claim 1, wherein there is an equal number of radiating elements and IC chips in the array of antenna element modules.

15. A phased array antenna comprising:

an array of antenna element modules, each of the array of antenna element modules comprising:

a dielectric substrate having a lower surface with a conductive trace;

a radiating element disposed at an upper surface of the dielectric substrate; and an integrated circuit (IC) chip adhered to the lower surface of the dielectric substrate and connected to the conductive trace, the IC chip including a circuit to adjust a signal communicated with the radiating element through the dielectric substrate by phase shifting and/or amplifying the signal to steer a beam formed by the phased array antenna; and a lower substrate underlying the array of antenna element modules, the lower substrate including a beam forming network (BFN) circuit, wherein the IC chip of each of the array of antenna element modules is electrically coupled to the BFN circuit through the conductive trace of each respective dielectric substrate through a first instance of conductive bonding material extending between a top surface of the lower substrate to the conductive trace, and at least one further instance of conductive bonding material, coupled to a ground, and laterally disposed with respect to the first instance of conductive bonding material, wherein the conductive trace has a first end and an opposite, second end, and extends along the lower surface of the dielectric surface from the first end to the second end, the first end is connected directly to the first instance of conductive bonding material, and the second end is connected to the IC circuit directly through an additional instance of conductive bonding material.

16. The phased array antenna of claim 15, wherein the at least one further instance of conductive bonding material is a plurality of further instances of conductive bonding material.

17. The phased array antenna of claim 15, wherein the lower substrate is a multi-layer substrate.

18. A method for forming a phased array antenna, the method comprising:

forming a plurality of antenna element modules, each of the array of antenna element modules comprising:

a dielectric substrate having a lower surface with a conductive trace;

a radiating element; and an integrated circuit (IC) chip adhered to the lower surface of the dielectric substrate and connected to the conductive trace, the IC chip including a circuit to adjust a signal communicated with the radiating element;

forming a lower substrate configured to underlie the array of antenna element modules, the lower substrate including a beam forming network (BFN) circuit formed on a layer of the lower substrate and the BFN circuit is configured for electrical communication with the IC chip of each of the array of antenna element modules, wherein the dielectric substrate of each of the array of antenna element modules provides an electrical connection between a respective radiating element and a respective IC chip and between the respective IC chip and the BFN without a blind via; and mounting each of the plurality of antenna element modules on the lower substrate.

19. The method of claim 18, wherein the mounting comprises applying an electrical bonding material to an array of patterned mounting interfaces on a conductive layer of the lower substrate.

20. The method of claim 19, wherein the mounting further comprises electrically coupling each IC chip of the array of antenna element modules with the BFN circuit through vias that extend from the BFN circuit to the conductive layer of the lower substrate, wherein a subset of the vias is coupled through the electrical bonding material to a respective conductive trace of a respective antenna element module.

* * * * *